(12) United States Patent
Oksman et al.

(10) Patent No.: US 8,578,458 B2
(45) Date of Patent: Nov. 5, 2013

(54) ADMISSION OF A NODE TO THE NETWORK

(75) Inventors: Vladimir Oksman, Morganville, NJ (US); Pramod Pandey, Unterhaching (DE); Joon Bae Kim, Lexington, MA (US)

(73) Assignee: Lantiq Deutschland GmbH, Neubiberg (DE)

( * ) Notice: Subject to any disclaimer, the term of this patent is extended or adjusted under 35 U.S.C. 154(b) by 105 days.

(21) Appl. No.: 13/040,259

(22) Filed: Mar. 3, 2011

(65) Prior Publication Data
US 2011/0271333 A1 Nov. 3, 2011

Related U.S. Application Data

(60) Provisional application No. 61/310,035, filed on Mar. 3, 2010.

(51) Int. Cl.
*H04L 29/06* (2006.01)

(52) U.S. Cl.
USPC ............. 726/5; 726/1; 726/2; 726/3; 726/4; 726/6; 726/7; 726/9; 726/10; 726/26; 726/27; 726/28; 726/29; 726/30; 713/150; 713/163; 713/168; 713/169; 713/171; 713/172; 713/176; 713/182; 713/183; 713/184; 713/185; 713/186; 709/201; 709/204; 709/217; 709/219; 709/223; 709/224; 709/225; 709/226; 709/227; 709/229

(58) Field of Classification Search
USPC ............ 726/1–10, 26–30; 713/150, 160–163, 713/168–186; 709/201–207, 217–229
See application file for complete search history.

(56) References Cited

U.S. PATENT DOCUMENTS

| | | | |
|---|---|---|---|
| 7,367,046 B1 * | 4/2008 | Sukiman et al. .................. 726/2 |
| 7,751,358 B2 * | 7/2010 | Kuure et al. ..................... 370/312 |
| 2006/0203837 A1 * | 9/2006 | Shvodian ....................... 370/445 |
| 2007/0177554 A1 * | 8/2007 | Yang et al. ..................... 370/338 |
| 2008/0132215 A1 * | 6/2008 | Soderstrom et al. .......... 455/416 |
| 2008/0229390 A1 * | 9/2008 | Holm et al. ....................... 726/3 |
| 2009/0234910 A1 * | 9/2009 | Chung et al. .................. 709/203 |
| 2010/0319062 A1 * | 12/2010 | Danieli et al. .................... 726/7 |

OTHER PUBLICATIONS

Implementing a Protocol for Maintenance and Construction of Network Topologies in TOWN by Fiedler et al; Publisher: TIK Computer Engineering and Networks Laboratory; Date: Aug. 9, 2007.*

\* cited by examiner

*Primary Examiner* — Madhuri Herzog
(74) *Attorney, Agent, or Firm* — SpryIP, LLC

(57) ABSTRACT

In at least one implementation a method includes receiving an identifier associated with a device, entering the identifier into a network controller device, inviting the device associated with the identifier to join a network, admitting the device associated with the identifier to the network, sending the device associated with the identifier a name of the network, and confirming that the device has joined the network as a device recognized by the network controller device.

16 Claims, 2 Drawing Sheets

ADMISSION OF A NODE TO THE NETWORK

RELATED APPLICATIONS

This application claims the benefit of priority to U.S. Provisional Patent Application Ser. No. 61/310,035, filed on 2010 Mar. 3, the disclosure of which is incorporated by reference herein.

BACKGROUND

In the scope of recent developments of energy management of devices and the use of an overall "Smart Grid," it is assumed that many utility devices (e.g., refrigerators, ovens, washing machines, etc.) in homes and offices will be connected to an in-home communication network ("home network"). This home network, in turn, may be connected to a utility or service provider via an external communication network in the neighborhood or through the broadband network or Internet. When connected to the network, the customer and the utility or service provider may be able to monitor and control the utility device, to reduce or optimize energy consumption and efficiently control operational modes.

There are two initial conditions necessary to provide reliable identification and authentication of the device. (1) The utility device has to be connected to the appropriate network, i.e., to the network that the user desires to connect. In case network is built over a shared medium, like wireless or powerline, a utility device connected to the medium can detect and potentially can join to more than one network. Some of these networks can belong to neighbors or potential intruders. (2) The utility device needs to have the right password to be authenticated after it joins the network.

Ordinarily, a user through an appropriate user interface enters into a new utility device, prior to connection to the medium, the name of the network the device is supposed to join (e.g., the well known SSID value for wireless LAN) and the password (e.g., the WEP key value for wireless LAN). However, many utility devices do not include the necessary user interface to enable the entry of such foregoing information.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Overview

At least one implementation herein enables devices to join a network using a straightforward network connection process that does not require reinstallation or readmission. Devices may join a network remotely, by a service provider, or the like. In one implementation, a user mails (physical or electronic) a password or identification of the node to the service provider or network administrator (the user may be the network administrator). The idea is that the network performs a special procedure called "admission by invitation" to enable the device to gain access to the network.

Exemplary Communication Arrangement

Figure 1:
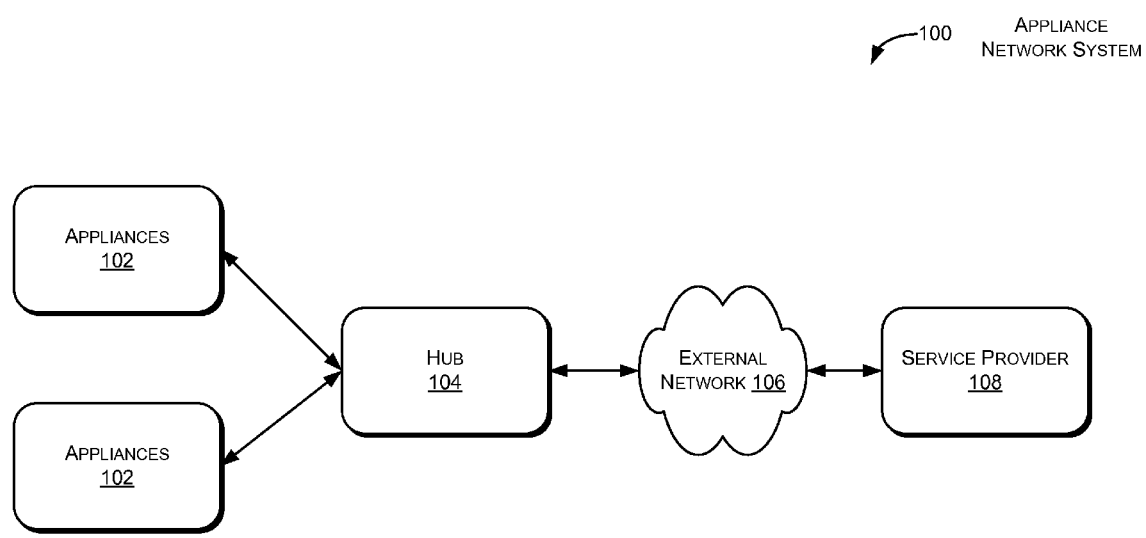
FIG. 1 shows the construction of an appliance networking system in accordance with at least one implementation.

FIG. 1 shows the construction of an appliance networking system 100 in accordance with at least one implementation. As is shown in FIG. 1, the appliance networking system 100 comprises a plurality of home appliances 102, such as a washing machine, microwave, oven, etc., connected to an internal network of a home networking system.

A hub 104, which can be networking equipment, is connectable to the appliances 102 to connect the internal network of the home networking system to an external network 106 as needed. For example, such an external network may be the Internet, local area network, wide area network, or the like. The external network may be connected to a service provider 108 or other entity that is enabled to interface with the networks and the appliances 102.

In one implementation, the appliances 102 are Orthogonal Frequency Division Multiplexing (OFDM) apparatuses.

The appliances 102 may communicate through the networks to various entities. The networks may be realized as a wireless communication medium, a wireline communication medium (e.g., coaxial cable, twisted pair of copper wires, power line wiring, optical fiber, etc.), or combinations thereof. Accordingly, the appliances 102 may include structure and functionality that enable signal communication over such medium. Such structure and functionality may include one or more antennas, integrated wireline interfaces, and the like. Depending on the implementation, the appliances 102 may communicate with one another or other entities directly (peer-to-peer mode) or the appliances 102 may communicate via a controller apparatus or the like.

The appliances 102 may be enabled to communicate using packet-based technology (e.g., ITU G.hn, HomePNA, HomePlug® AV and Multimedia over Coax Alliance (MoCA)) and xDSL technology. Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the appliances 102 may be enabled to communicate using IEEE 802.11 and IEEE 802.16 (WiMAX) wireless technologies.

The appliances 102 may include a transmitter that incorporates a number of different elements. For example, the transmitter may include an encoder, a modulator, a filter, an interface and a controller. As used herein, the term "controller" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Furthermore, the appliances 102 may include various storage structures, medium and devices, such as, memory (RAM, ROM, etc.,) SSD, hard disk(s), and the like.

Exemplary procedures are described below. It should be understood that certain acts need not be performed in the order described, and may be modified, and/or may be omitted entirely, depending on the circumstances. The acts described may be implemented and executed by a computer, processor or other computer device, such as a wireless or wireline device (e.g., an appliance 102), based on instructions stored on one or more computer-readable storage media associated with the wireless or wireline device and/or associated with other storage media not co-located with the device. The computer-readable storage media can be any available media that can be accessed by a computer device to implement the instructions stored thereon. As used herein, the term "instructions", "computer program" or "software" is meant to include any sequence or human or machine cognizable acts which perform a function. The exemplary procedures and acts may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Furthermore, the disclosed exemplary procedures and associated acts may be hardware and firmware as well, or alternatively as some combination thereof.

Figure 2:
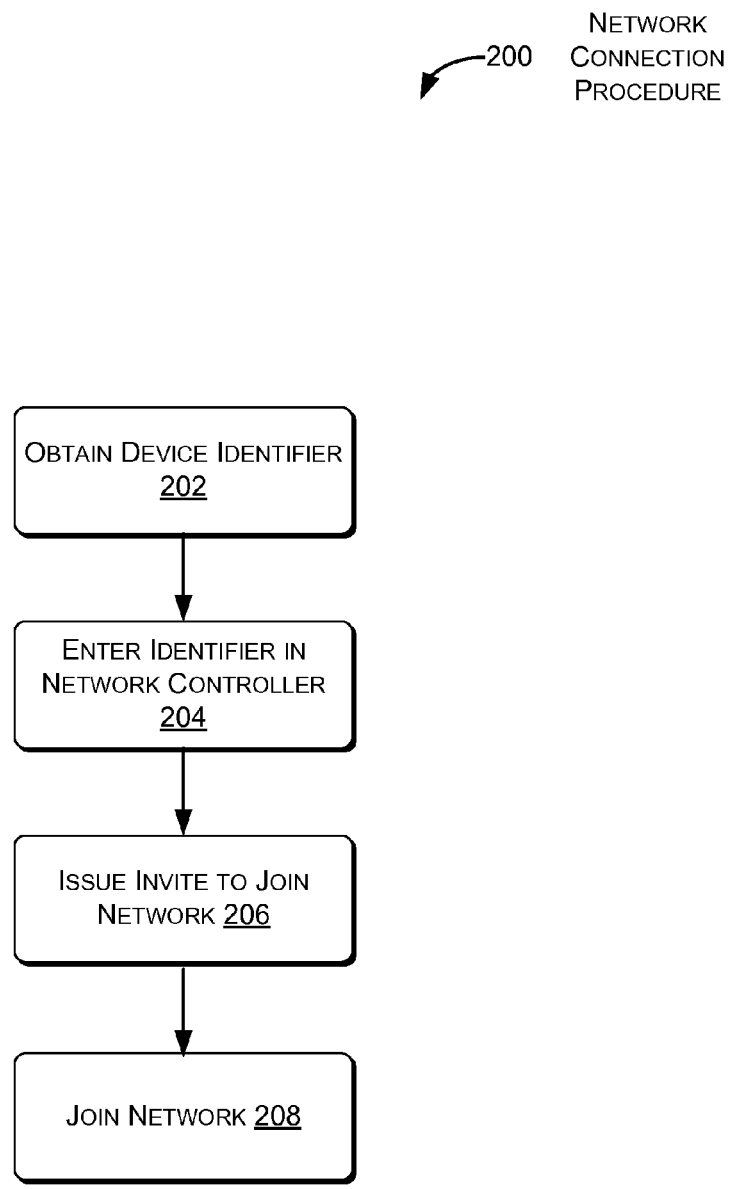
FIG. 2 is a flow diagram of a procedure useable to enable an appliance or other device to connect to a network.

FIG. 2 is a flow diagram of a procedure 200 useable to enable an appliance or other device to connect to a network. At Act 202, a user obtains an identifier (number, alphanumeric tag, or the like) from a device (e.g., an appliance) and mails, either electronically or physically, the identifier to a network administrator associated with a service provider. The identifier may be obtained when the appliance is purchased, from the manufacturer of the appliance, from a label associated with the appliance, or another source. The identifier is also stored in the associated appliance.

At Act 204, the network administrator enters the identifier into a network controller, remotely or locally, associated with a network. The network controller may be associated with the service provider, an appliance, or any other network related device or element. At Act 206, the network controller "invites" the appliance associated with the identifier to join a network. At Act 208, once the appliance has received the network name of the network controller via the invite, the appliance may connect and subsequently rejoin the network. In secure networks, the network administrator may also require and use a security password which is the part of the Identification tag and which allows the new device to authenticate on the network and further communicate securely. The following implementations may be implemented by the foregoing described network procedure 200

In one particular implementation, the identifier is Device Identification Tag (DIT) that contains two parts: a secret part and a non-secret part. The non-secret part is a Device (node) Name (DN) and the secret part is the password (PW) of the device for authentication purposes. The customer, after he/she connects the new device to the network, mails (e.g. via web access, via phone call, by e-mail, etc.) the DIT to the network administrator using a trusted channel (since the PW shall be mailed securely). The network administrator could be the user, or the third trusted party that has physical or remote access to the network controller. The network controller may also include a security controller, which may be used in secure networks. In a particular implementation, the service provider is the network administrator (the typical case) and the administrator communicates the DN part of the DIT through the network to the network controller and the PW part of the DIT to the security controller using a secure channel. In one implementation, the network controller and the security controller may be one node that is also a gateway node, if connected to the outside network.

In another implementation, the network controller transmits the DN of the device in the special field called "Invited Device Name" inside a Beacon (or Media Access Plan (MAP)) that is transmitted ones every MAC cycle, and thus invites the device to join a network. The device seeking admission to the network, searches the "Invited Device Name" field in some or all Beacon frames. After the device detects a Beacon frame that includes the "Invited Device Name" that fits the DN value of its DIT, the device synchronizes with this network and may begin a regular admission procedure. After admitted to the network, the new device collects the network name (e.g., SSID) of the network from the corresponding field of the Beacon and uses it for all future registrations (e.g., after power-down or disconnection by the user). The device may indicate during the admission that it is a "blind device" (e.g., a device that does not have a suitable user interface and has to be connected to the network without user configuration). After admission is over (either successful or denial), the network controller may reset the corresponding "Invited Device Name", and may use this field to admit another blind device. There may be more than one "Invited Device Name" fields. After being registered into the network, the new device may authenticate via the security controller using the PW and standard authentication procedure.

In another implementation, the device may be registered into a particular domain of the network, identified by a Domain Name instead of network name. The information relevant for this procedure may be distributed by the network controller in messages that are other than Beacon messages and that are predefined to be recognized during the admission process.

In another implementation, when the security is not a concern, the DIT of the blind device may not include a PW and no authentication procedure is needed.

In another implementation, the DN may not be a part of the DIT, and the blind device may find the appropriate network based on the PW. The PW is provided to the SC by the network administrator as was described hereinabove. More specifically, the device may scan for Beacons it can observe and creates the list of networks (network domains) that are visible. The device may select the first network found, or attempt join a network of a plurality of networks based on manufacture-defined criteria. One criterion may be the highest power of a received Beacon. Another criterion may be whether the device can see specific messages sent by the network or special indications advertized by network controller regarding acceptance of blind devices and the security status of the network. Other criteria may also be used. After device joins a particular network, it attempts to authenticate itself with the security controller of the network. If authentication fails after the appropriate number of attempts, the device resigns from the network, removes the name of this network from its list, and registers into the next network on its list. The procedure continues till device is either authenticated in one of the networks or the list of networks is exhausted. After device is authenticated, it collects the network name of the network it authenticated on and may use that network name for subsequent admissions (after power off or disconnection from the network).

In yet another implementation, the device DIT is embedded in the device by the manufacturer, retrieved by the user, and/or programmed into the network controller automatically and, if necessary, the security controller by the user. Third party network administrator, for example associated with a service provider, intervention is not necessary in this implementation. For example, the embedded DIT may be in the form of barcode or RFID. 2. The network controller and/or security controller may retrieve the DIT directly from the device via barcode scanner or RFID reader that is already part of the network controller and/or security controller (e.g., bringing the device close to network controller and/or security controller).

While the exemplary implementations illustrated herein may show the various components of the arrangement collocated, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses, such as a modem, or collocated on a particular node of a distributed network, such as a telecommunications network. Moreover, it should be understood that the components of the described arrangements may be arranged at any location within a distributed network without affecting the operation of the arrangements. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the arrangement may be distributed between a modem and an associated computing device.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

The implementations herein may be described in terms of exemplary embodiments. However, it should be appreciated that individual aspects of the implantations may be separately claimed and one or more of the features of the various embodiments may be combined.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

What is claimed is:

1. A method, comprising:
    receiving an identifier associated with a device;
    entering the identifier into a network controller device;
    inviting the device associated with the identifier to join a network, the inviting including sending a network name of the network controller or a domain name of the network to the device associated with the identifier, the device to select one of a plurality of available networks and, after being admitted to a selected network, the device is to attempt to authenticate with a security controller associated with the selected network;
    registering the device to a different network if the attempt to authenticate fails, the registering including the device selecting the different network from the plurality of available networks;
    sending the device associated with the identifier a name of a network; and
    confirming that the device has joined a network as a device recognized by the network controller device.

2. The method according to claim 1, wherein the device has rudimentary user interface capabilities.

3. The method according to claim 1, further comprising performing an authentication process to admit the device to a secure network.

4. The method according to claim 3, wherein the performing the authentication process act includes receiving a password from the device.

5. The method according to claim 4, wherein the inviting act is implemented by a first entity and the performing the authentication process act is implemented by a second entity.

6. The method according to claim 4, wherein the inviting and performing the authentication process acts are implemented by a common entity.

7. The method according to claim 1, wherein the inviting act includes transmitting the received identifier in a field associated with a message.

8. One or more processor-readable storage devices having processor-executable instructions embodied thereon, the processor-executable instructions, when executed by one or more processors, direct the one or more processors to perform operations comprising:
- receiving an identifier;
- entering the identifier into storage;
- inviting a device associated with the identifier to join a network, the inviting including sending a network name of the network controller or a domain name of the network to the device associated with the identifier, the device to select one of a plurality of available networks and, after being admitted to a selected network, the device is to attempt to authenticate with a security controller associated with the selected network;
- registering the device to a different network if the attempt to authenticate fails, the registering including the device selecting the different network from the plurality of available networks;
- sending the device associated with the identifier a name of a network; and
- confirming that the device has joined a network as a device recognized by the network controller device.

9. One or more processor-readable storage devices as recited in claim 8, further comprising performing an authentication process to admit the device to a secure network.

10. One or more processor-readable storage devices as recited in claim 9, wherein the performing the authentication process act includes receiving a password from the device.

11. One or more processor-readable storage devices as recited in claim 8, wherein the inviting act includes transmitting the received identifier in a field associated with a message.

12. One or more processor-readable storage devices as recited in claim 11, wherein the message is a beacon message.

13. The method according to claim 1, wherein the network controller includes a security controller and the identifier includes a device name (DN) and a password (PW).

14. The method according to claim 13, wherein the act of entering the identifier into a network controller device includes entering the DN into the network controller and entering the PW into the security controller.

15. The method according to claim 14, wherein the PW is entered into the security controller via a secure channel.

16. The method according to claim 1, wherein the act of inviting the device associated with the identifier includes including a device name (DN) of the device in beacon frames transmitted in the network to invite the device having the DN.

* * * * *